US009268471B2

(12) United States Patent
Na et al.

(10) Patent No.: US 9,268,471 B2
(45) Date of Patent: Feb. 23, 2016

(54) METHOD AND APPARATUS FOR GENERATING DIRECTIONAL SOUND (71) Applicant: Samsung Electronics Co., Ltd., Gyeonggi-do (KR)

(72) Inventors: Boyeon Na, Gyeonggi-do (KR); Jaehyeon Kang, Gyeonggi-do (KR); Kwangtai Kim, Gyeonggi-do (KR); Jihyun Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/327,443

(22) Filed: Jul. 9, 2014

(65) Prior Publication Data

US 2015/0018038 A1 Jan. 15, 2015

(30) Foreign Application Priority Data

Jul. 9, 2013 (KR) ........................ 10-2013-0079994

(51) Int. Cl.
H04M 1/00 (2006.01)
G06F 3/0484 (2013.01)
H04M 1/03 (2006.01)
G10K 11/34 (2006.01)
H04M 1/19 (2006.01)
H04M 1/60 (2006.01)

(52) U.S. Cl.
CPC .......... *G06F 3/04842* (2013.01); *G10K 11/341* (2013.01); *H04M 1/035* (2013.01); *H04M 1/19* (2013.01); *H04M 1/6008* (2013.01)

(58) Field of Classification Search
CPC ..... H04M 1/19; H04M 1/6008; H04M 1/035; H04M 1/72522; H04M 1/72527; H04M 1/7253; H04M 2250/52; G01K 11/341; G06F 3/04842; H04N 2007/145
USPC ..................... 455/556.1, 41.3, 3.06; 702/187; 381/122, 92
See application file for complete search history.

(56) References Cited

U.S. PATENT DOCUMENTS

| 7,194,816 | B2 * | 3/2007 | Tamura ....................... 33/355 R |
| 7,269,452 | B2 * | 9/2007 | Cheung ..................... H04S 1/00 455/556.1 |
| 8,488,799 | B2 * | 7/2013 | Goldstein ............... G10L 19/00 381/122 |
| 2003/0163287 | A1 * | 8/2003 | Vock ..................... A43B 3/0005 702/187 |
| 2004/0114772 | A1 * | 6/2004 | Zlotnick .................. H04R 3/12 381/92 |
| 2008/0207115 | A1 * | 8/2008 | Lee ...................... H04M 1/7253 455/3.06 |
| 2009/0043504 | A1 * | 2/2009 | Bandyopadhyay et al. .. 701/213 |
| 2009/0156249 | A1 * | 6/2009 | Ruckart ..................... 455/550.1 |
| 2010/0211387 | A1 * | 8/2010 | Chen .............................. 704/226 |
| 2010/0299390 | A1 * | 11/2010 | Alameh et al. ................ 709/204 |
| 2011/0003550 | A1 * | 1/2011 | Klinghult .............. G06F 1/1684 455/41.3 |
| 2011/0170787 | A1 * | 7/2011 | Gum ............................. 382/209 |
| 2012/0134507 | A1 * | 5/2012 | Dimitriadis .............. H04R 3/00 381/92 |
| 2013/0040611 | A1 * | 2/2013 | Rega et al. ..................... 455/413 |
| 2013/0089218 | A1 * | 4/2013 | Kishinami et al. .............. 381/92 |
| 2013/0322767 | A1 * | 12/2013 | Chao et al. .................... 382/199 |

FOREIGN PATENT DOCUMENTS

| KR | 10-2011-0093031 | 8/2011 |
| KR | 10-1133672 | 3/2012 |

* cited by examiner

*Primary Examiner* — Mahendra Patel (57) ABSTRACT

A method of directing sound in a mobile device equipped with a directional speaker includes determining a location of a target in relation to the mobile device, and adjusting a direction of sound output from the directional speaker toward the target, based on the location of the target. An apparatus for generating directional sound includes a directional speaker configured to control a direction in which sound is output, and a controller configured to determine a location of a target in relation to the mobile device, and adjust a direction of sound output from the directional speaker toward the target, based on the location of the target. Other embodiments are also disclosed.

20 Claims, 11 Drawing Sheets

METHOD AND APPARATUS FOR GENERATING DIRECTIONAL SOUND

CROSS-REFERENCE TO RELATED APPLICATION AND CLAIM OF PRIORITY

The present application is related to and claims the benefit under 35 U.S.C. §119(a) of a Korean patent application No. 10-2013-0079994 filed on Jul. 9, 2013 in the Korean Intellectual Property Office, the entire disclosure of which is hereby incorporated by reference.

TECHNICAL FIELD

The present disclosure relates to a method and apparatus for directing sound, and more particularly, to a method and apparatus for outputting sound based on location information.

BACKGROUND

Recently, with the development of technology, portable terminal devices have come to be widely used. Some portable terminal devices provide notifications to users by outputting sound. For example, a mobile phone can notify a user by outputting sound in response to an incoming call request or when an SMS message is received. Furthermore, a mobile phone may notify a user by outputting sound when an alarm time set by a user is reached.

However, in general, the direction in which sound is output is not set appropriately, that is, sound is output in all directions without directionality. Furthermore, the volume of sound output is not suitably set. In this case, other persons can feel disturbed and inconvenienced because the sound with the high volume is coming from other's terminal other than their terminals.

Accordingly, there is a need for a method of appropriately controlling a direction of sound, or a volume of sound, or both.

SUMMARY

To address the above-discussed deficiencies, it is a primary object to provide a method and apparatus for outputting sound to a user in a suitable way.

An apparatus for generating directional sound includes a directional speaker configured to control a direction in which sound is output, and a controller configured to determine a location of a target in relation to the mobile device, and adjust a direction of sound output from the directional speaker toward the target, based on the location of the target.

In some embodiments, the controller is configured to set a magnitude of output sound based on a distance between the apparatus and the target, the directional speaker configured to generate the sound having the magnitude of the sound in the adjusted direction.

In some embodiments, the apparatus further includes a camera configured to capture an image, a display configured to provide an interface screen, and an input unit configured to receive an input through the interface, wherein the controller is configured to obtain the image through the camera, provide an interface for selecting the target in relation to a location of the apparatus on the obtained image, and obtain information on the target location from an input received through the interface.

In some embodiments, the apparatus further includes an input unit configured to receive first input, wherein the controller is configured to obtain information on a path along which the sound output apparatus has moved after the first input was performed and obtain the information on the relative location based on the obtained information on the path.

In some embodiments, the apparatus further includes an infrared sensor configured to detect infrared rays, wherein the controller is configured to estimate a distance from the sound output apparatus to the target location based on a volume of a voice having a predetermined pattern when detecting the voice and estimate the direction from the sound output apparatus toward the target location using the infrared sensor.

In some embodiments, the apparatus further includes a short-range communication module configured to detect a short-range communication signal, wherein the control unit obtains information on a location of an external device in response to a short-range communication signal and obtains the information on the relative location based on the information on the location of the external device.

In some embodiments, the controller is configured to trace movement of the mobile device after determining the location of the target, and adjust the direction of the sound, based on the movement of the mobile device.

In some embodiments, the apparatus further includes a microphone configured to detect a voice having a predetermined pattern, wherein the controller is configure to estimate a distance between the mobile device and the target, based on a volume of the voice.

In some embodiments, the apparatus further includes an infrared sensor configured to detect infrared light, wherein the controller is configured to estimate the direction from the mobile device toward the target, based on the detected infrared light.

In some embodiments, the sound is an alarm sound personalized to a user.

A method of directing sound in a mobile device equipped with a directional speaker includes determining a location of a target in relation to the mobile device, and adjusting a direction of sound output from the directional speaker toward the target, based on the location of the target.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, some embodiments of the present disclosure are described in detail with reference to the accompanying drawings.

In describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

In the following embodiments, the target location is the location at which sound generated from a sound output apparatus arrives. The sound output apparatus obtains information on the target location according to one of the following embodiments or a similar method, and performs sound output suitable for the target location.

Figure 1:
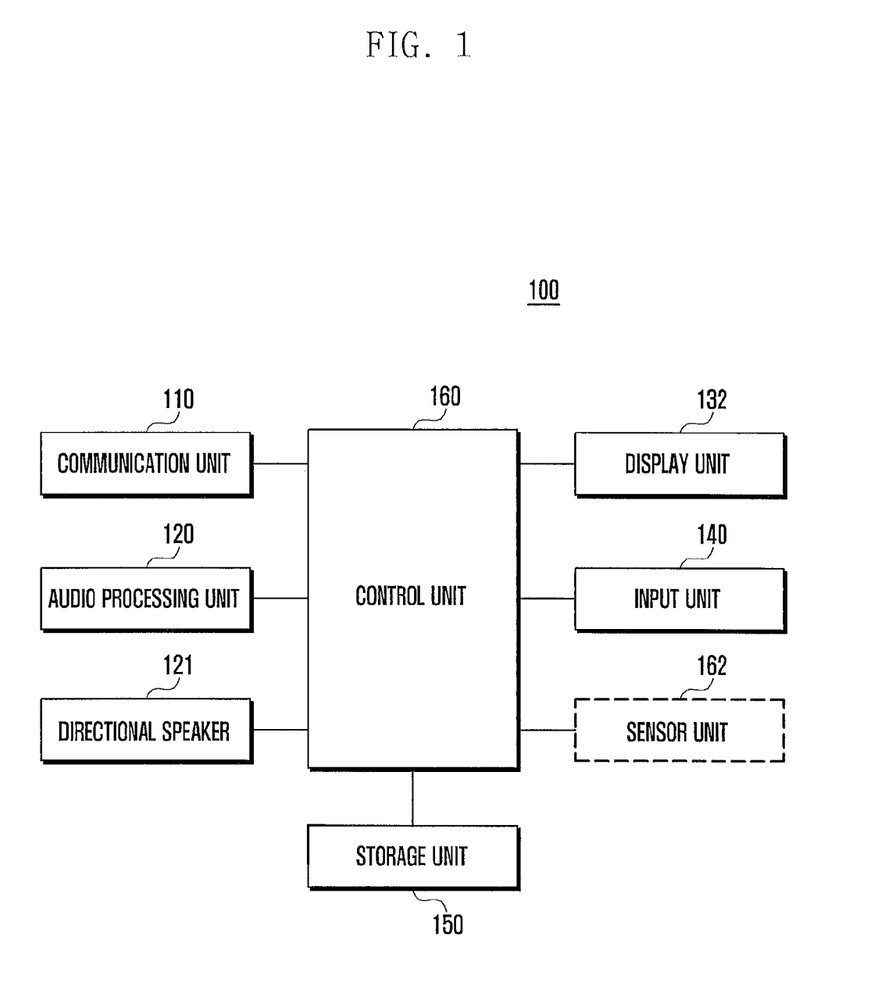
FIG. 1 is a block diagram of a sound output apparatus 100 in accordance with an embodiment of the present disclosure.

FIG. 1 is a block diagram of the sound output apparatus 100 in accordance with an embodiment of the present disclosure.

Referring to FIG. 1, the sound output apparatus 100 in accordance with an embodiment of the present disclosure can include a communication unit (e.g., transceiver) 110, an audio processing unit 120, a directional speaker 121, a display unit 132, an input unit 140, a storage unit 150, and a control unit (e.g., controller) 160. In particular, in accordance with some embodiments, the sound output apparatus can further include a sensor unit 162. In some embodiments in which a sensor construction is unnecessary, the sensor unit 162 may be omitted.

The communication unit 110 performs a function of transmitting and receiving corresponding data for the communication of the sound output apparatus 100. The communication unit 110 can be implemented, for example, in the form of a wireless communication module. The wireless communication module can include an RF transmitter for performing up-conversion and amplification on the frequency of the transmitted signal, and an RF receiver for performing low-noise amplification on the received signal and performing down-conversion on the frequency of the amplified signal. Furthermore, the communication unit 110 can receive data, output the received data to the control unit 160, and send data generated from the control unit 160. In accordance with another embodiment, the communication unit 110 can be implemented in the form of a wired communication module. In this case, the communication unit 110 performs wired data communication. In accordance with yet another embodiment, the communication unit 110 may include both a wired communication module and a wireless communication module. In the case where the sound output apparatus 100 does not require communication, the communication unit 110 may be omitted.

The audio processing unit 120 can be implemented with a codec(s). The codec can include a data codec for processing packet data and an audio codec for processing an audio signal, such as a voice. The audio processing unit 120 converts a digital audio signal into an analog audio signal through the audio codec, plays the analog audio signal through the directional speaker 121, and converts an analog audio signal received through a microphone into a digital audio signal through the audio codec.

The directional speaker 121 can control the direction of sound under the control of the control unit 160 and output the sound by focusing the sound in that direction. The volume of sound that is detected by another device placed in the direction in which the directional speaker 121 is oriented is much greater than the volume of sound that is detected by other devices placed in other directions. Accordingly, a user who is situated in the direction in which the directional speaker 121 is oriented can clearly hear output sound, but persons who are situated in other directions seldom hear the output sound. The directional speaker 121 can output sound in response to a signal received from the audio processing unit 120. A method of controlling the direction of the directional speaker and a method of obtaining the directionality of speaker output are known in the art, and thus a detailed description thereof is omitted.

In accordance with an embodiment in which only the volume of sound output is controlled without controlling the direction of speaker sound output, the directional speaker 121 may be replaced with a speaker that does not include directionality or a speaker whose direction cannot be controlled.

The input unit 140 can be implemented, for example, with a touch sensor or a keypad or both.

The touch sensor detects a user's touch input. The touch sensor can consist of a touch sensor using a capacitive overlay method, a pressure-resistive overlay method, or an infrared beam method, or can consist of a pressure sensor. In addition to the sensors, the touch sensor of the present disclosure can consist of all types of sensors capable of detecting a contact or pressure of an object. The touch sensor detects a user's touch input, generates a detection signal according to the user's touch input, and sends the detection signal to the control unit 160. The detection signal includes coordinate data corresponding to the user's touch input. If a user performs a touch location movement operation, the touch sensor generates a detection signal including coordinate data corresponding to a touch location movement path and sends the detection signal to the control unit 160.

A keypad receives a user's key manipulation for controlling the sound output apparatus 100, generates an input signal, and transfers the input signal to the control unit 160. The keypad can include numeric keys and direction keys, and the keypad can be formed on one side of the sound output apparatus 100 as a specific function key. In accordance with an embodiment of the present disclosure, in a sound output apparatus in which all manipulations can be performed using only the touch sensor, the keypad can be omitted. In a sound output apparatus in which all manipulations can be performed using only the key pad, a touch sensor can be omitted.

In particular, in accordance with an embodiment of the present disclosure, the input unit 140 can detect a user's input for setting a target location or the location of the sound output apparatus 100 or both. The user's input can include, for example, a touch (including multi-touch), a drag, and key input.

The display unit 132 can be implemented with a Liquid Crystal Display (LCD), Organic Light Emitting Diodes (OLED), or Active Matrix Organic Light Emitting Diodes (AMOLED), The display unit 132 visually provides a user with the menus of the sound output apparatus 100, input data, function setting information, and various pieces of other information. The display unit 132 performs a function of displaying the boot screen, the standby screen, the menu screen, the call screen, and other application screens of the sound output apparatus 100. In particular, the display unit 132 can provide an interface screen for setting a target location in accordance with an embodiment of the present disclosure.

The storage unit 150 functions to store programs and data necessary for the operation of the sound output apparatus 100. The storage unit 150 can be divided into a program region and a data region. The program region can store a program for controlling the overall operation of the sound output apparatus 100, an Operating System (OS) for running the sound output apparatus 100, applications for multimedia content playback, etc., and applications for other optional functions of the sound output apparatus 100, such as a camera function, a sound playback function, and an image or moving image display function. The data region stores data generated when the sound output apparatus 100 is used, and can store images, moving images, a phone book, and audio data. In particular, the storage unit 150 can store information on a target location and information associated with the information on the target location. Furthermore, the storage unit 150 can store information on the volume of sound output from the directional speaker 121.

The control unit 160 controls the overall operation of the elements of the sound output apparatus 100. In particular, the control unit 160 controls the display unit 132 and the input unit 140 of the sound output apparatus 100 so as to provide an interface for setting a target location.

In accordance with some embodiments of the present disclosure, the sensor unit 162 detects information necessary to obtain and estimate information on a target location. The detailed construction of the sensor unit 162 can vary according to each embodiment. In particular, in accordance with some embodiments, the sensor unit 162 can be omitted, and information on a target location can be obtained through a user's input.

Figure 2:
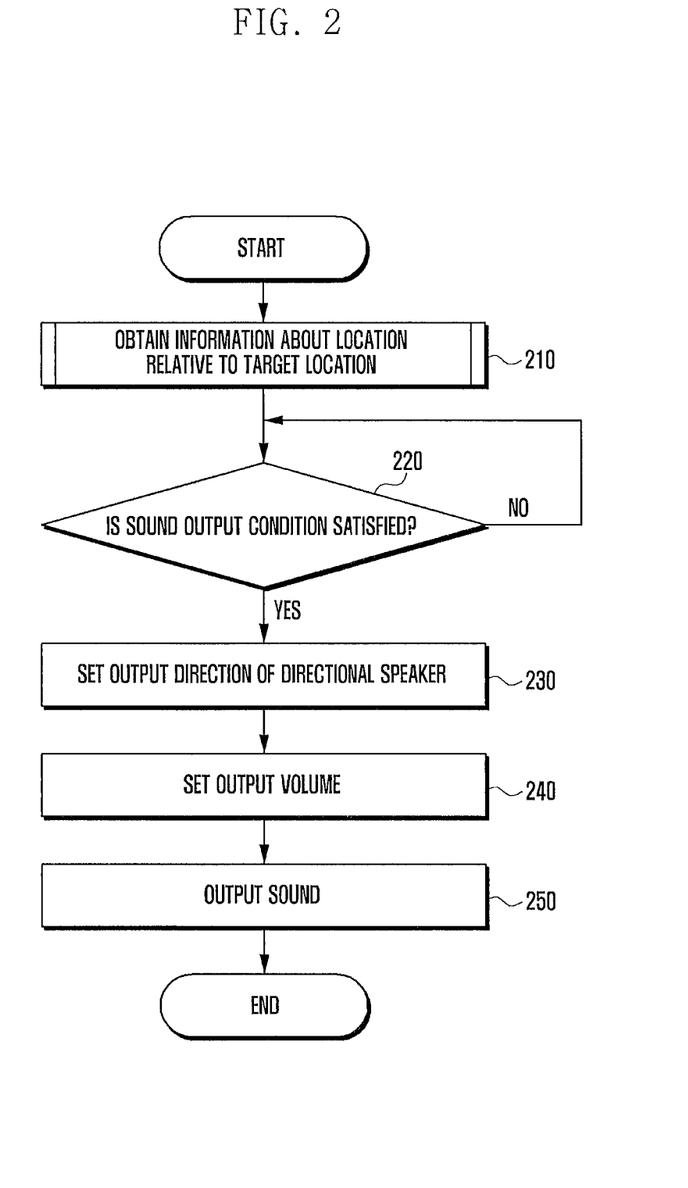
FIG. 2 is a flowchart illustrating a sound output process in accordance with an embodiment of the present disclosure.

The operation of each of the elements is described in detail with reference to FIGS. 2 to 10. FIG. 2 is a flowchart illustrating a sound output process in accordance with an embodiment of the present disclosure.

At operation 210, the control unit 160 obtains information on a location relative to a target location. The information on the location relative to the target location can include direction-related information, that is, information regarding the direction in which the target location is located in relation to the sound output apparatus 100, or distance-related information, that is, information on the distance between the sound output apparatus 100 and the target location, or both. The detailed process of obtaining information on the relative location is described in detail later with reference to FIGS. 3 to 10.

At operation 220, the control unit 160 determines whether or not a sound output condition is satisfied. For example, if the sound output apparatus 100 has been configured to inform a user of a call request or an SMS message using sound output in response to the call request or the SMS message, it is determined that the sound output condition is satisfied. In accordance with another example, when an alarm time is reached, the control unit 160 can determine that the sound output condition has been satisfied. When an event for which a sound is set to be output occurs, the control unit 160 can determine that the sound output condition has been satisfied. If, as a result of the determination, it is determined that the sound output condition is satisfied, the process proceeds to operation 230. If, as a result of the determination, it is determined that the sound output condition is not satisfied, the process remains at operation 220 until the sound output condition is satisfied.

In accordance with a modified example, if only some of the events for which a sound is set to be output are set so as to cause sound to be output by taking a target location into consideration, operations 230 to 250 can be performed only when those events occur. When an event set such that the target location is not taken into consideration, from among the events for which a sound is set to be output, occurs, sound is output according to a conventional method, without taking the target location into consideration.

At operation 230, the control unit 160 sets the output direction of the directional speaker 121 based on the information on the relative location. The control unit 160 can set the output direction of the directional speaker 121 so that the directional speaker 121 is directed towards the target location. Here, the output direction refers to a direction in which the output sound is clearly heard. That is, the output sound is relatively soft in directions other than the output direction, and the output sound is relatively loud in the output direction.

The case where the directional speaker 121 cannot be set in all directions, but can only be set in some directions, can be taken into consideration. If the direction of the target location is limited so that the directional speaker 121 cannot be directed towards the direction, the control unit 160 can control the directional speaker 121 so that it is set in the direction that is closest to the direction of the target location. In accordance with a modified example, if the direction of the target location is limited so that the directional speaker 121 cannot be directed towards the direction, the control unit 160 can perform control so that sound is output according to a conventional method without using the directional speaker 121.

In accordance with another modified example, when obtaining the information on the relative location, the control unit 160 can set the output direction of the directional speaker 121 even before the sound output condition is satisfied. In this case, if the sound output condition is satisfied, the control unit 160 does not set the output direction of the directional speaker 121 again, but can control the directional speaker 121 so that it outputs sound in the previously set direction.

At operation 240, the control unit 160 sets the volume of sound output from the directional speaker 121 based on the information on the relative location. The control unit 160 can set the volume of sound output from the directional speaker 121 based on the distance between the target location and the sound output apparatus 100. For example, the control unit 160 can control the volume of sound output from the directional speaker 121 so that the volume of sound is inversely proportional to the distance between the target location and the sound output apparatus 100. Setting the volume of sound output can be performed in such a way as to control the magnitude of the signal input to the directional speaker 121 or to control the magnitude of the signal to be output by the directional speaker 121, from among the signals input to the directional speaker 121.

In accordance with a modified example, when obtaining the information on the relative location, the control unit 160 can set the volume of sound output from the directional speaker 121 even before the sound output condition is satisfied. In this case, when the sound output condition is satisfied, the control unit 160 need not set the volume of sound output from the directional speaker 121 again, but can control the directional speaker 121 so that it outputs sound at a previously set sound output volume.

At operation 250, the control unit 160 controls the directional speaker 121 so that it outputs sound based on the setting of operations 230 and 240.

In accordance with a modified example, only one of operations 230 and 240 may be performed. For example, in accordance with an embodiment in which only information on the direction from the sound output apparatus 100 to the target location is used, operation 240 can be omitted. In this case, the processes of collecting, obtaining, and estimating information on the distance between the sound output apparatus 100 and the target location can be omitted. In accordance with an embodiment in which only information on the distance between the sound output apparatus 100 and the target location is used, operation 230 can be omitted. In this case, the processes of collecting, obtaining, and estimating information on the direction from the sound output apparatus 100 to the target location can be omitted.

Figure 3:
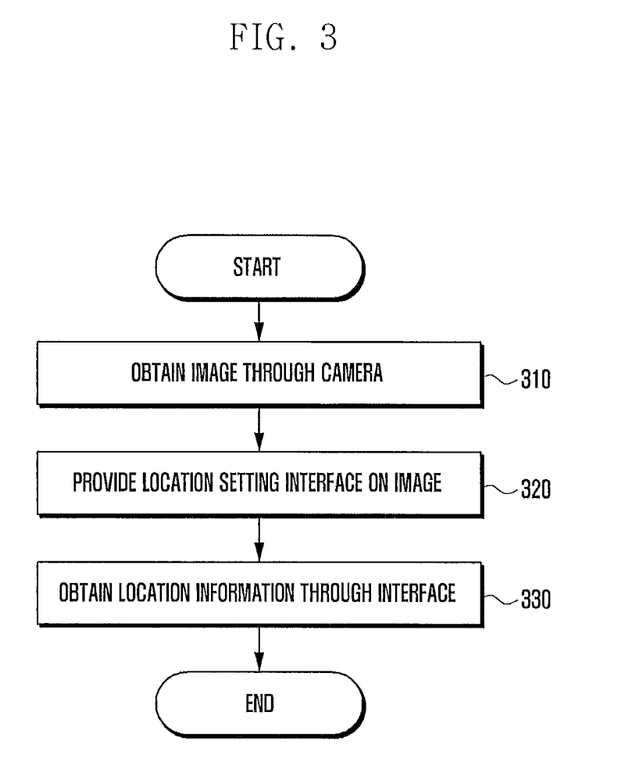
FIG. 3 is a detailed diagram illustrating the process 210 of obtaining information on the relative location in accordance with a first embodiment of the present disclosure.

FIG. 3 is a detailed diagram illustrating the process 210 of obtaining information on the relative location in accordance with a first embodiment of the present disclosure.

Figure 4:
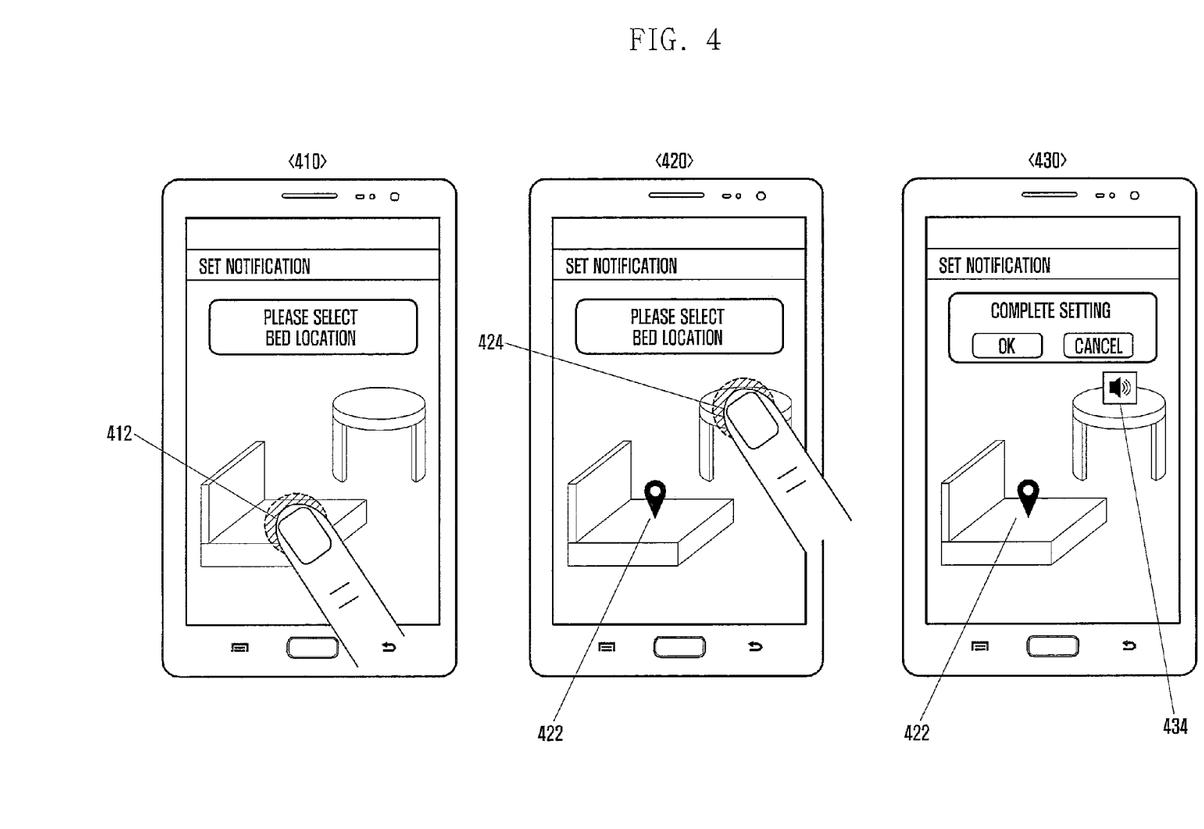
FIG. 4 shows an interface for obtaining information on the relative location in accordance with a first embodiment of the present disclosure.

FIG. 4 shows an interface for obtaining information on the relative location in accordance with a first embodiment of the present disclosure.

In accordance with the first embodiment of the present disclosure, the sound output apparatus 100 further includes a camera.

Referring to FIG. 3, at operation 310, the control unit 160 obtains an image through the camera. At operation 320, the control unit 160 can provide an interface for setting the target location and the location of the sound output apparatus 100 on the obtained image through the display unit 132 and the input unit 140. Here, the image, that is, the background of the interface, can be an image that is captured using the camera in real time and then transferred, or can be a still image captured by the camera at a specific point of time. At operation 330, the input unit 140 receives input for setting the target location and the location of the sound output apparatus 100 through the interface and transfers a corresponding input signal to the control unit 160. The control unit 160 can obtain information on the target location and the relative location of the sound output apparatus 100 in response to the input signal.

Referring to FIG. 4, an interface for setting a target location (e.g., the location of a bed) is provided in a first screen 410. The image displayed on the first screen is an image captured by the camera that shows a bed and a table. The input unit 140 receives input for setting the target location 412 and transfers a corresponding input signal to the control unit 160. An interface for setting the location 424 of the sound output apparatus 100, for example, a mobile phone, is provided in a second screen 420. An icon 422 indicative of the target location set in the previous screen 410 is provided in the second screen 420, for user convenience. The input unit 140 receives input for setting the location 424 of the sound output apparatus 100 and transfers a corresponding input signal to the control unit 160. The icon 422 indicative of the target location set in the previous screen 410 and an icon 434 indicative of the location of the sound output apparatus 100 set in the previous screen 420 are displayed on a third screen 430. When an OK button is selected in the third screen 430, the input process for setting the location is completed. Input for setting the location of the sound output apparatus 100, the target location, or both can include one or more of input using a touch sensor and input using keys. If a keypad is used, a direction key for moving a cursor on the interface and a key for setting the target location or the location of the sound output apparatus 100 can be used.

A camera which provides an automatic focusing function can obtain information on the distance to a subject. The control unit 160 can obtain the distance information from the camera and estimate the distance from the sound output apparatus 100 to each location when the image is captured. In order to provide this function, the sound output apparatus 100 can output a message that requests a user to slightly vary the orientation of the camera or the sound output apparatus 100 in order to measure the distance. The user changes the orientation of the sound output apparatus 100 in response to the message. When all pieces of distance information necessary for the camera have been obtained, the sound output apparatus 100 can output a message stating that it is no longer necessary to vary the orientation. In accordance with another embodiment, the sound output apparatus 100 can include an additional sensor for measuring the distance, and can provide the control unit 160 with the distance between a specific location selected on a captured image and the sound output apparatus 100 when the image was captured. In accordance with yet another embodiment, the control unit 160 can estimate the distance between the selected specific location and the sound output apparatus 100 when the image was captured, using depth information and focus information that are included in the image.

The control unit 160 can determine the distance between the locations set in the screens 410 and 420 based on the information.

If information on the direction from the sound output apparatus 100 towards the target location is used, an interface for setting the direction of the sound output apparatus 100 can be additionally provided. For example, in the images displayed in FIG. 4, an interface for setting the direction in which the front of the sound output apparatus 100 is oriented and the direction in which the top of the sound output apparatus 100 is oriented can be provided. The control unit 160 can obtain information on the orientation of the sound output apparatus 100 that has been set through the interface. The control unit 160 can obtain and estimate information on the direction in which the directional speaker 121 of the sound output apparatus 100 needs to be oriented in order for the directional speaker 121 to be directed towards the target location based on the setting information.

In accordance with a modified example, the sensor unit 162 of the sound output apparatus 100 can include a sensor for detecting the rotation of the sound output apparatus 100 after the image displayed in FIG. 4 was captured. When the rotation of the sound output apparatus 100 is detected, the direction in which the sound output apparatus 100 was oriented when the image was captured can be modified, and the relative direction of the target location can be estimated based on the orientation of the sound output apparatus 100, which is estimated when sound output is finally necessary.

In accordance with another modified example, the sensor unit 162 of the sound output apparatus 100 can include a gravity sensor or a terrestrial magnetism sensor or both. The control unit 160 can use the gravity sensor or the terrestrial magnetism sensor or both to estimate the direction in which the sound output apparatus 100 was oriented when an image was captured. The vertical direction from the sound output apparatus 100 towards the target location, the horizontal direction from the sound output apparatus 100 towards the target location, or both can be determined using the captured image based on the information. Thereafter, when sound is output, the sound output apparatus 100 can estimate the orientation of the sound output apparatus 100 using the gravity sensor or the terrestrial magnetism sensor or both. The control unit 160 can obtain and estimate information on the direction in which the directional speaker 121 of the sound output apparatus 100 needs to be oriented in order for the directional speaker 121 to be directed towards the target location based on an estimation of the orientation of the sound output apparatus 100 when the image was captured and an estimation of the orientation of the sound output apparatus 100 when sound is output.

Figure 5:
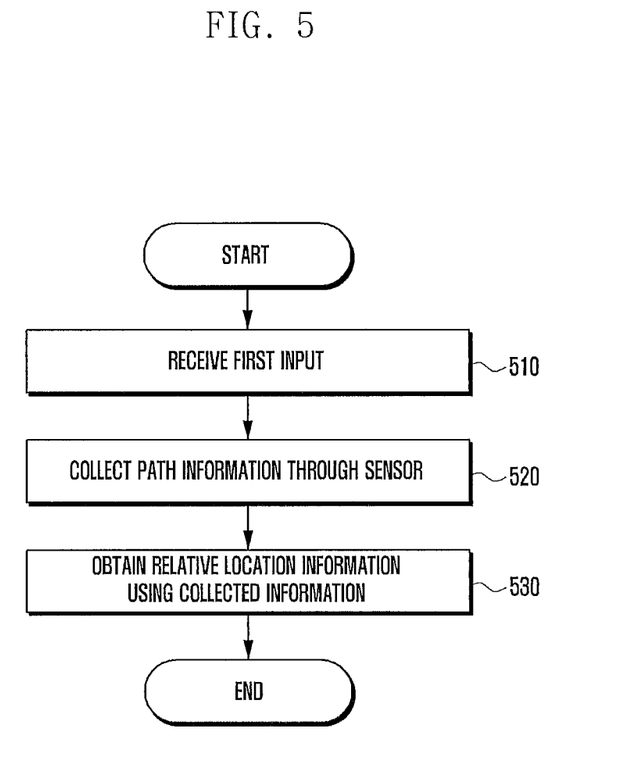
FIG. 5 is a detailed diagram illustrating the process 210 of obtaining information on the relative location in accordance with a second embodiment of the present disclosure.

FIG. 5 illustrates the process 210 of obtaining information on the relative location of the target in accordance with a second embodiment of the present disclosure.

Referring to FIG. 5, at operation 510, the sound output apparatus 100 receives first input through the input unit 132. The first input indicates that the location of the sound output apparatus 100 at the time of the first input is a target location. At operation 520, the sensor unit 162 of the sound output apparatus 100 can collect information on the path of the sound output apparatus 100. At operation 530, the control unit 160 can obtain information on the location relative to the target location, corresponding to the location of the sound output apparatus 100, based on the collected information.

Figure 6A:
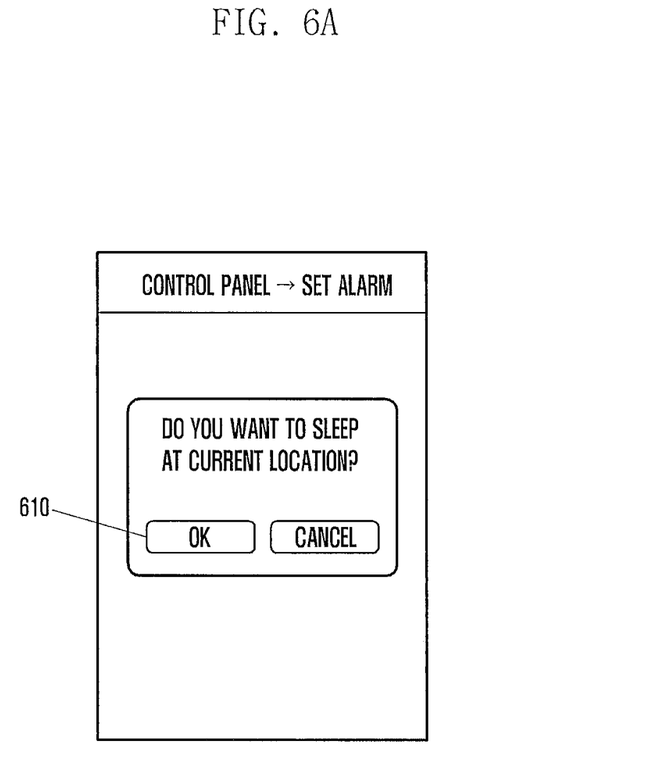
FIG. 6A shows an interface screen for setting a target location in accordance with a second embodiment of the present disclosure.

FIG. 6A shows an interface screen for setting a target location in accordance with a second embodiment of the present disclosure. And FIG. 6B illustrates setting a target location in accordance with the second embodiment of the present disclosure.

Figure 6B:
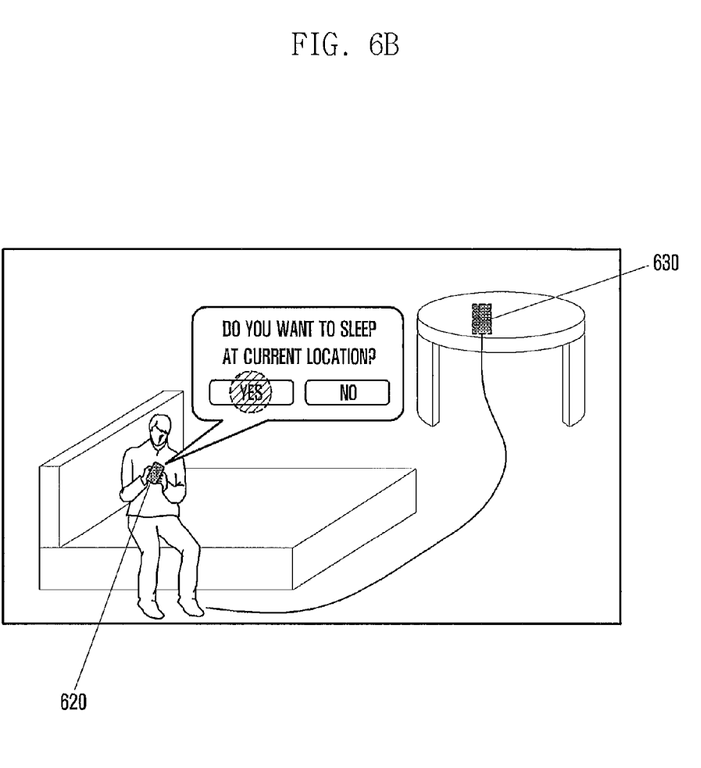
FIG. 6B is a diagram illustrating the process of setting a target location in accordance with the second embodiment of the present disclosure.

Referring to FIGS. 6A and 6B, a user performs first input through an alarm setting interface (see FIG. 6A), provided in the sound output apparatus 100, at a target location 620. The control unit 160 can provide an interface, such as that of FIG. 6A, through the display unit 132 and the input unit 140. The user can perform the first input by touching or selecting an OK button 610. After the first input, the user places the sound output apparatus 100 on the top of a table 630. After receiving the first input, the sensor unit 162 of the sound output apparatus 100 traces the path of the sound output apparatus 100. As a result the sensor unit 162 can collect data on the path along which the sound output apparatus 100 has moved, or a direction in which the sound output apparatus 100 is oriented, or both. In the first embodiment, the sensor unit 162 can include one or more of a terrestrial magnetism sensor, a rotation sensor, a gravity sensor, and other similar sensors. Alternatively, the sensor unit 162 can obtain the path information through a Global Positioning System (GPS) module.

The sound output apparatus 100 can collect the path information, for example, until it receives input indicating that the collection of the path information should be stopped. In accordance with another example, after receiving the first input, the sound output apparatus 100 can collect the path information until a predetermined time has elapsed. In accordance with yet another example, the sound output apparatus 100 can collect the path information until a predetermined time has elapsed in the state in which the sound output apparatus 100 remains stopped. In accordance with a modified example, the sound output apparatus 100 can collect the path information until sound output using the target location is generated.

Thereafter, in the event in which a reason to output sound occurs, such as an incoming call request or the arrival of an alarm time, the controller unit (or controller) 160 can set the output direction of the directional speaker 121 or the volume of sound output from the directional speaker 121 or both based on information on the distance to the target location, the direction of the target location, or both.

Figure 7:
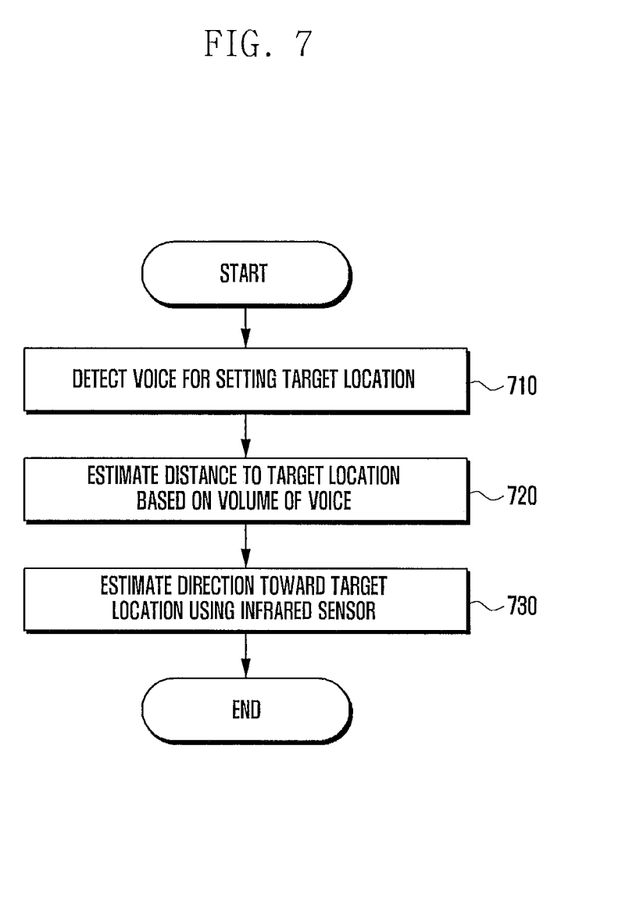
FIG. 7 is a flowchart illustrating the process of obtaining information on a relative location in accordance with a third embodiment of the present disclosure.

FIG. 7 is a flowchart illustrating the process of obtaining information on a relative location in accordance with a third embodiment of the present disclosure.

Figure 8:
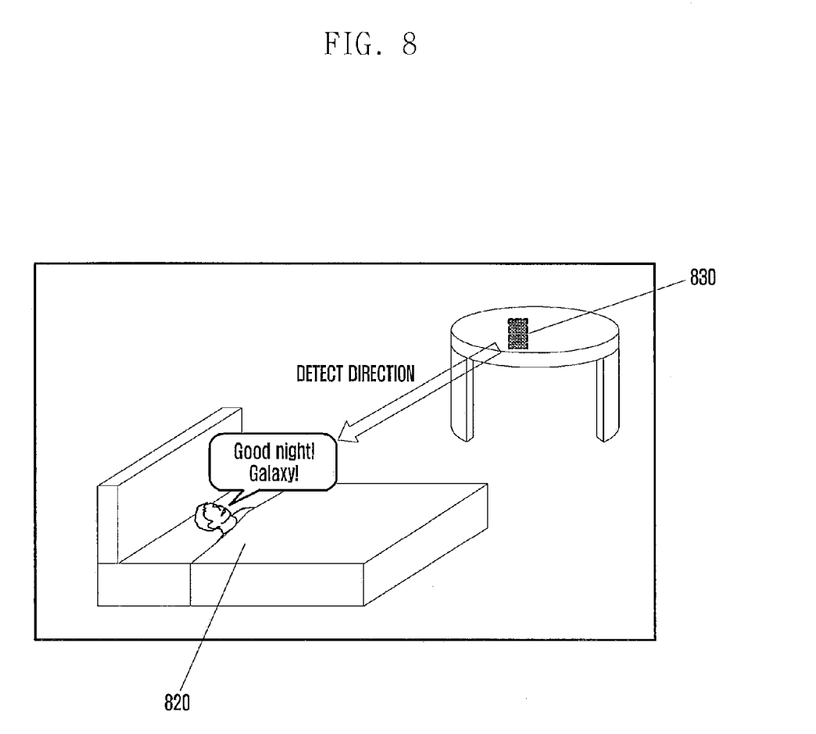
FIG. 8 is a diagram illustrating the process of obtaining information on a relative location in accordance with the third embodiment of the present disclosure.

FIG. 8 is a diagram illustrating the process of obtaining information on a relative location in accordance with the third embodiment of the present disclosure.

At operation 710, the sound output apparatus 100 detects a voice for setting a target location. The voice for setting the target location can be, for example, a predetermined vocal phrase (e.g., 'set target location'). A user can use the voice input to set the target location through a microphone or in text form in advance. Thereafter, the control unit 160 of the sound output apparatus 100 can determine whether or not a speech signal received through the speaker corresponds to the vocal phrase for setting the target location by analyzing the speech signal.

For example, a user can speak a predetermined vocal phrase of 'Good night Galaxy' at a target location 820. The sound output apparatus 100 can receive the sound at its location 830 and determine that the sound corresponds to the vocal phrase for setting the target location.

At operation 720, the sound output apparatus 100 can estimate the distance from the location 830 to the target location 820 using the volume of the sound detected at operation 710. The information on the estimated distance can be subsequently used to determine the magnitude of voice output from the directional speaker 121. Operation 720 can be omitted in an embodiment in which information on the distance between the location of the sound output apparatus 100 and the target location is not used.

At operation 730, the sensor unit 162 can obtain information on the direction from the sound output apparatus 100 to the target location 820 using an infrared sensor included in the sensor unit 162. In this case, the temperature around the user at the target location 820 needs to be higher than the surrounding temperature. In general, since the temperature of the human body is higher than the ambient air temperature or the temperature of a wall or the floor, the target location 820 at which the user is located can be checked using the infrared sensor. Operation 730 can be omitted in an embodiment in which information on the direction from the sound output apparatus 100 to the target location is not used.

In accordance with a modified example, the control unit 160 can obtain the information on the direction from the sound output apparatus 100 to the target location based on the direction of a voice detected at operation 710. In order to implement this embodiment, the sound output apparatus 100 can further include an element, such as a radar detector, for checking the directionality of a received speech signal. For example, two or more directional microphones configured to receive a speech signal from a specific direction, or a directional microphone configured to have its direction periodically changed, can be used to detect the directionality of a received speech signal. Alternatively, a microphone that moves periodically can be used to check the change in the frequency of a received speech signal and detect the directionality of the speech signal on the basis of the Doppler Effect.

Figure 9:
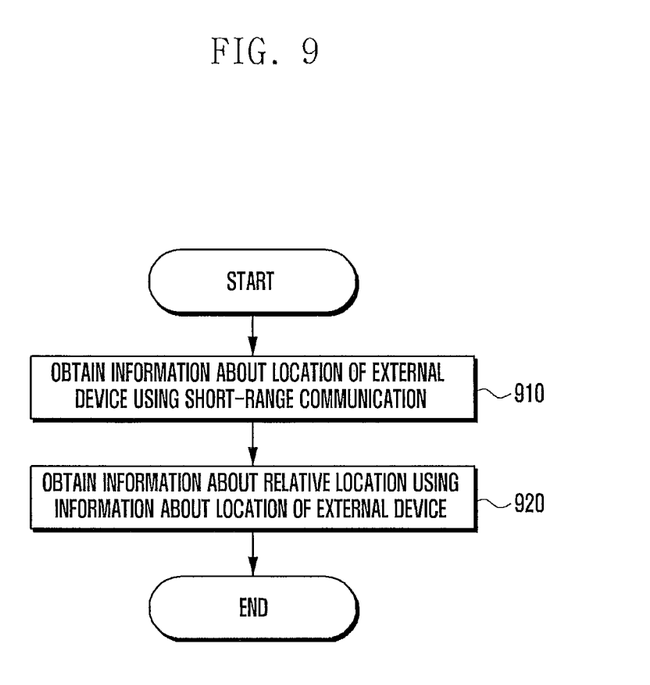
FIG. 9 is a flowchart illustrating the process of obtaining information on the relative location in accordance with a fourth embodiment of the present disclosure.

FIG. 9 is a flowchart illustrating the process of obtaining information on the relative location in accordance with a fourth embodiment of the present disclosure.

Figure 10:
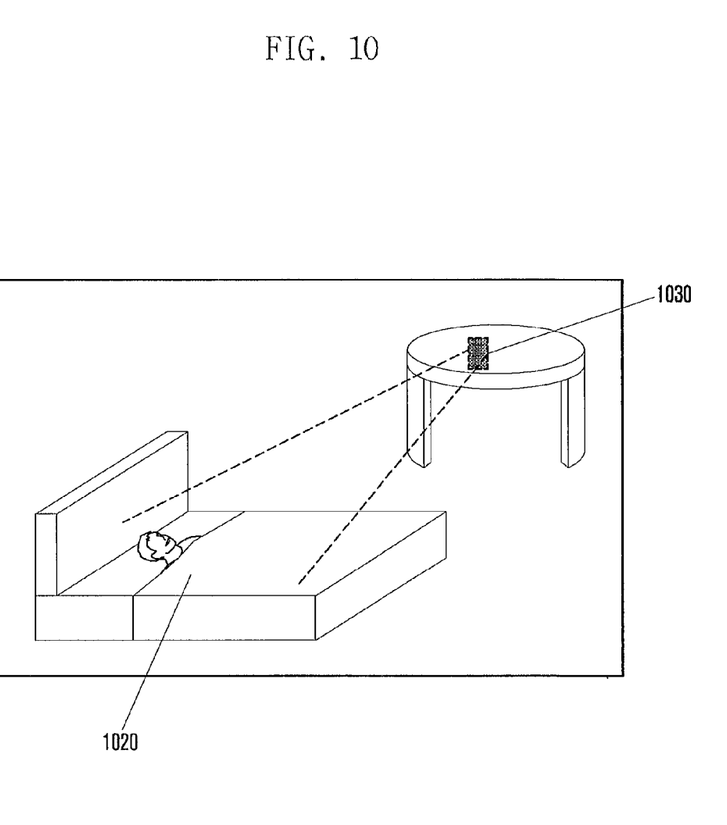
FIG. 10 is a diagram illustrating the process of obtaining information on the relative location in accordance with the fourth embodiment of the present disclosure.

FIG. 10 is a diagram illustrating the process of obtaining information on the relative location in accordance with the fourth embodiment of the present disclosure.

At operation 910, the control unit 160 obtains information on the location of an external device through a short-range communication technology. At least some of Bluetooth™, Near Field Communication (NFC), Wi-Fi Direct™, and other communication protocols for use over short ranges can be used for the short-range communication. To this end, the sound output apparatus 100 can further include a short-range communication module, Here, the external device functions to indicate the target location. The external device can generate a communication signal for sending a signal that is used to communicate with the short-range communication module of the sound output apparatus 100 or can indicate the location of the external device to the short-range communication module of the sound output apparatus 100. The external device can include, for example, a stylus pen or other device that can be carried by a user. The signal for indicating the location of the external device can be previously agreed upon by both the external device and the sound output apparatus 100.

At operation 920, the control unit 160 can obtain information on the location relative to a target location (i.e., the location of the external device) based on the information on the location of the external device obtained at operation 910.

For example, the sound output apparatus 100 (located at position 1030) can obtain information on the location relative to a target location by detecting an NFC signal that is generated by a stylus pen (a kind of external device) held by a user who is located at position 1020.

The control unit 160 can obtain information on the distance to the target location using the intensity of the received short-range communication signal. For example, the control unit 160 can determine that the distance to a target location is far based on the reduction in the intensity of a received short-range communication signal. This process can be omitted in an embodiment in which information on the distance to a target location is not used.

Furthermore, the control unit 160 can obtain information on the direction towards a target location based on the direction from which the short-range communication signal is received. In this case, the sound output apparatus 160 can include an element capable of detecting the direction from which the short-range communication signal is received. For example, the control unit 160 can detect the direction from which a short-range communication signal is received using two or more directional antennas that are capable of better receiving the short-range communication signal when the signal is received from a specific direction.

In accordance with a modified example, the external device can include a GPS module, obtain information on its own location using the GPS module, and send the location information to the sound output apparatus 100. The sound output apparatus 100 can obtain information on the location relative to a target location based on information on the location of an external output device, information on the location of the sound output apparatus 100, and information on the orientation thereof.

In accordance with some of the embodiments of the present disclosure, a suitable sound signal can be provided only to the user, without inconveniencing other persons, because sound can be output appropriately based on the target location.

In accordance with an embodiment of the present disclosure, sound can be output to a user in an appropriate way.

In the present disclosure, it will be understood that each block of the flowchart illustrations and combinations of the blocks in the flowchart illustrations can be implemented by computer program instructions. These computer program instructions can be mounted in the processor of a general purpose computer, a special purpose computer, or other programmable data processing apparatus, such that the instructions executed via the processor of the computer or other programmable data processing apparatus create means for executing the functions specified in the flowchart block or blocks. These computer program instructions can also be stored in a computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block or blocks. The computer program instructions can also be loaded into a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Furthermore, each block of the flowchart illustrations can represent a portion of a module, a segment, or code, which includes one or more executable instructions for implementing specified logical function(s). It should also be noted that in some alternative implementations, the functions noted in the blocks can occur out of order. For example, two blocks shown in succession can in fact be executed substantially concurrently, or the blocks can sometimes be executed in the reverse order, depending upon the functionality involved.

Here, the term 'unit', as used herein, means, but is not limited to, a software or hardware component, such as a Field Programmable Gate Array (FPGA) or Application Specific Integrated Circuit (ASIC), which performs certain tasks. The unit can advantageously be configured to reside on an addressable storage medium, and can be configured to execute one or more processors. Thus, the module can include, for example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and modules can be combined into fewer components and modules, or can be further separated into additional components and modules. Furthermore, the components and modules can be implemented to execute on one or more CPUs within a device or a security multimedia card.

The sound output apparatus in accordance with an embodiment of the present disclosure can include a portion of a portable electronic device, such as a mobile phone, a Personal Digital Assistant (PDA), a navigator, a digital broadcasting receiver, or a Portable Multimedia Player (PMP).

As described above, those skilled in the art to which the present disclosure pertains will understand that the present disclosure may be implemented in various other forms without departing from the technical spirit or essential characteristics of the present disclosure. Accordingly, the aforementioned embodiments should not be construed as being limitative, but should be understood as being only illustrative from all aspects. The scope of the present disclosure is clearly disclosed in the appended claims, rather than in the detailed description. It should be understood that all modifications or variations derived from the meanings and scope of the present disclosure and equivalents thereof are included in the scope of the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of directing sound in a mobile device equipped with a directional speaker, the method comprising:
   determining a location of a target in relation to the mobile device;
   receiving a user input for modifying the location of the target in relation to the mobile device;
   obtaining information regarding a moving path of the mobile device when the mobile device has moved since the user input was received;
   adjusting a direction of sound output from the directional speaker toward the target, as a function of a direction of the target and a distance of the target and the information regarding the moving path of the mobile device; and
   outputting sound in the adjusted direction through the directional speaker.

2. The method of claim 1, further comprising:
   measuring the distance of the target from the mobile device.

3. The method of claim 1, further comprising:
   obtaining a surrounding image through a camera;
   providing the surrounding image to a user on a screen; and
   selecting the target on the image, based on a user input.

4. The method of claim 1, further comprising a sensor comprising at least one of a terrestrial magnetism sensor, a rotation sensor, or a gravity sensor.

5. The method of claim 1, wherein determining the location of the target comprises:
   tracing movement of the mobile device after determining the location of the target; and
   adjusting the direction of the sound, based on the movement of the mobile device.

6. The method of claim 1, further comprising:
   detecting a voice having a predetermined pattern by a microphone;
   estimating a distance between the mobile device and the target, based on a volume of the voice.

7. The method of claim 1, further comprising:
   detecting infrared light by an infrared sensor;
   estimating the direction from the mobile device toward the target, based on the detected infrared light.

8. The method of claim 1, further comprising:
   recognizing the target by a camera;
   estimating the direction from the mobile device toward the target, based on the recognized target.

9. The method of claim 1, wherein determining the location of the target comprises:
   obtaining information on a location of an external device based on a short-range communication signal; and
   obtaining the information on the relative location based on the information on the location of the external device.

10. The method of claim 1, wherein the sound is an alarm sound personalized to a user.

11. An apparatus for generating directional sound, the apparatus comprising:
    an input unit;
    a directional speaker; and
    a controller configured to:
       control a direction in which sound is output from the directional speaker;
       determine a location of a target in relation to the mobile device;
       receive, via the input unit, a user input for modifying the location of the target in relation to the apparatus;
       adjust the direction of sound output from the directional speaker toward the target, as a function of a direction of the target and a distance of the target and information regarding a moving path of the mobile device; and
       control the directional speaker to output sound in the adjusted the direction when a sound output condition is satisfied.

12. The apparatus of claim 11, wherein:
    the controller is configured to set a magnitude of output sound based on the distance between the apparatus and the target; and
    the directional speaker is configured to generate the sound having the magnitude of the sound in the adjusted direction.

13. The apparatus of claim 11, further comprising:
    a camera configured to capture an image;
    a display configured to provide an interface screen; and
    an input unit configured to receive an input through the interface,
    wherein the controller is configured to:
       obtain the image through the camera,
       provide an interface for selecting the target in relation to a location of the apparatus on the obtained image, and
       obtain information on the target location from an input received through the interface.

14. The apparatus of claim 11, further comprising:
    wherein the controller is configured to obtain information on a relative location based on the obtained information regarding the moving path.

15. The apparatus of claim 11, further comprising:
    an infrared sensor configured to detect infrared rays, wherein the controller is configured to estimate a distance from the sound output apparatus to the target location based on a volume of a voice having a predetermined pattern when detecting the voice and estimate the direction from the sound output apparatus toward the target location using the infrared sensor.

16. The apparatus of claim 11, further comprising:
    a short-range communication module configured to detect a short-range communication signal, wherein the control unit obtains information on a location of an external device in response to a short-range communication signal and obtains the information on the relative location based on the information on the location of the external device.

17. The apparatus of claim 11, wherein the controller is configured to trace movement of the mobile device after determining the location of the target, and adjust the direction of the sound, based on the movement of the apparatus.

18. The apparatus of claim 11, further comprising:
a microphone configured to detect a voice having a predetermined pattern, wherein the controller is configure to estimate a distance between the apparatus and the target, based on a volume of the voice.

19. The apparatus of claim 11, further comprising:
an infrared sensor configured to detect infrared light, wherein the controller is configured to estimate the direction from the apparatus toward the target, based on the detected infrared light.

20. The apparatus of claim 11, wherein the sound is an alarm sound personalized to a user.

* * * * *